(12) United States Patent
DiBattista et al.

(10) Patent No.: US 6,783,184 B2
(45) Date of Patent: Aug. 31, 2004

(54) MOLDED ARTICLE HAVING A RIGID SUPPORT AND A FLEXIBLE HOLLOW MEMBER

(75) Inventors: Gerald A. DiBattista, McDonald, PA (US); Christopher Cooper, Moon Township, PA (US)

(73) Assignee: Bayer Polymers LLC, Pittsburgh, PA (US)

( * ) Notice: Subject to any disclaimer, the term of this patent is extended or adjusted under 35 U.S.C. 154(b) by 28 days.

(21) Appl. No.: 10/053,028

(22) Filed: Jan. 17, 2002

(65) Prior Publication Data

US 2003/0132657 A1 Jul. 17, 2003

(51) Int. Cl.[7] .............................. A47C 5/12; B29C 49/20
(52) U.S. Cl. .............................. 297/452.14; 297/452.65; 297/DIG. 2
(58) Field of Search .................... 297/451.11, 452.65, 297/452.18, 452.15, 452.14, 452.55, DIG. 2

(56) References Cited

U.S. PATENT DOCUMENTS

| | | | | |
|---|---|---|---|---|
| 2,390,878 A | * | 12/1945 | Greitzer | 248/165 |
| 3,233,885 A | * | 2/1966 | Propst | 297/452.15 |
| 3,565,486 A | * | 2/1971 | Channon | 297/451.11 |
| 3,988,789 A | | 11/1976 | Blount | |
| 4,059,909 A | | 11/1977 | Kron | |
| 4,246,734 A | | 1/1981 | Fogle, Jr. et al. | |
| 4,318,213 A | | 3/1982 | Blount | |
| 4,418,958 A | * | 12/1983 | Watkin | 297/452.15 |
| 4,544,205 A | * | 10/1985 | Molnar | 297/452.14 |
| 4,577,907 A | * | 3/1986 | Talmon et al. | 297/452.12 |
| 4,768,833 A | | 9/1988 | Virtue | |
| 4,938,528 A | | 7/1990 | Scott | |
| 5,044,663 A | | 9/1991 | Seizert | |
| 5,100,204 A | | 3/1992 | Makihara et al. | |
| 5,104,472 A | | 4/1992 | Kasugai et al. | |
| 5,122,325 A | | 6/1992 | Bartley et al. | |
| 5,190,803 A | | 3/1993 | Goldbach et al. | |
| 5,522,645 A | * | 6/1996 | Dahlbacka | 297/452.55 |
| 5,536,065 A | * | 7/1996 | Girardi | 297/215.14 |
| 5,711,575 A | * | 1/1998 | Hand et al. | 297/284.6 |
| 5,775,779 A | | 7/1998 | Abu-Isa et al. | |
| 5,976,451 A | | 11/1999 | Skaja et al. | |
| 6,036,272 A | * | 3/2000 | Samples et al. | 297/452.55 |
| 6,120,100 A | | 9/2000 | Palazzolo et al. | |
| 6,196,828 B1 | | 3/2001 | Newby, Sr. | |
| 6,234,578 B1 | | 5/2001 | Barton et al. | |
| 6,273,810 B1 | | 8/2001 | Rhodes, Jr. et al. | |
| 6,382,728 B1 | * | 5/2002 | Buono | 297/440.2 |

OTHER PUBLICATIONS

Patent Abstracts Of Japan, vol. 016, No. 406, (C–0978), Aug. 27, 1992 & JP 04 135510 A (Touyou Shiito:KK;Others:02), May 11, 1992 abstract.

* cited by examiner

Primary Examiner—Peter M. Cuomo
Assistant Examiner—Joseph Edell
(74) Attorney, Agent, or Firm—Joseph C. Gil; James R. Franks (57) ABSTRACT

A molded article comprising (a) a rigid support, e.g., a rigid seat support (10), having a plurality of perforations, and (b) a molded flexible hollow thermoplastic member (20), e.g., a flexible thermoplastic seat cushion, fixedly attached thereto is described. A portion of the flexible hollow member (b) extends through at least some of the perforations of the rigid support (a), embedding the edges of the perforations therein. The flexible material extending through the perforations forms an attachment element, e.g., an attachment head, that serves to fixedly attach the flexible hollow member (b) to the rigid support (a). Also described is a method of preparing the molded article of the present invention, in which the flexible hollow member (b) is fixedly attached to the rigid support (a) during the blow molding formation of hollow member (b).

20 Claims, 7 Drawing Sheets

MOLDED ARTICLE HAVING A RIGID SUPPORT AND A FLEXIBLE HOLLOW MEMBER

DESCRIPTION OF THE INVENTION

The present invention relates to a molded article comprising a rigid support having a plurality of perforations, and a molded flexible hollow member of thermoplastic material. Portions of the flexible hollow member extend through at least some of the perforations of the rigid support, and the edges of the perforations are embedded in the flexible material extending there through. The flexible material extending through the perforations serves to fixedly attach the flexible member to the rigid support. The present invention also relates to a process of preparing the molded article.

Flexible hollow thermoplastic articles, e.g., cushions, can be prepared by means of thermoplastic blow molding processes. Blow molding typically involves a multi-stage process. In the first stage, a flexible thermoplastic feed material, e.g., in the form of pellets, is extruded, typically in an extruder, and the resulting molten extrudate is passed through a die to form a hollow molten tube, which is referred to as a parison. The parison is drawn through or into an open mold. The mold is closed around the parison, pinching off at least one end of the parison. Compressed gas is then fed into the interior of the parison, which expands to fill the interior of the closed mold. While maintaining the internal pressure within the parison, the expanded parison is allowed to cool and solidify within the mold. The pressure within the solidified parison is released, the mold is opened, and a flexible hollow blow molded article is removed. Flexible hollow thermoplastic articles may also be prepared by other art recognized processes, which include, for example, twin-sheet thermoforming, rotational molding, thermoplastic welding (e.g., vibration and/or radio frequency welding), two-piece over-molding and lost-core molding.

The flexible hollow thermoplastic member or bladder, prepared for example by blow molding, is typically attached to a support structure. In the case of seat cushions, the flexible hollow thermoplastic bladder is attached to a seat back support and/or seat bottom support by means of, for example, a fabric jacket. The fabric jacket is attached to the support structure, e.g., by means of rivets and/or loops, and covers and tightly holds the flexible hollow thermoplastic bladder against the support structure. The flexible bladder may also be further or alternatively attached to the support structure by means of, for example, adhesives. The flexible bladder or cushion may be filled with air, or another material, such as a polymeric foam, e.g., a polyurethane foam.

Such methods of attaching flexible hollow thermoplastic bladders or cushions to a support structure, as described above, typically involve a series of manufacturing steps, and the use of additional materials, e.g., fabric jackets, rivets and adhesives. In addition, the position of the flexible hollow thermoplastic bladder or cushion can undesirably shift relative to or pull away from the support structure.

A need accordingly exists to develop molded articles, e.g., cushioned seats, in which the molded flexible hollow thermoplastic member, such as a bladder or cushion, is more securely fixed or attached to the rigid support of the article. A need also exists with regard to the development of new methods of preparing such molded articles in which the flexible member is concurrently molded and fixedly attached to the support structure, thereby reducing the number of manufacturing steps required.

U.S. Pat. No. 6,120,100 discloses a head rest assembly that is fabricated by a blow molding process, and which includes a skin surrounding a foam cushion, and an insert secured to the skin. The skin includes a channel dimensioned to receive the peripheral edge of the insert therein. The insert may be adhered to the skin either before or during the blow molding process.

In accordance with the present invention, there is provided a molded article comprising:

(a) a rigid support having a surface and a plurality of perforations having edges; and (b) a molded flexible member of thermoplastic material, at least a portion of said flexible member being in abutting relationship with at least a portion of the surface of said support, said flexible member having a hollow interior, wherein a portion of said flexible member extends through at least some of the perforations of said rigid support, the edges of said perforations being embedded in the portions of the flexible member extending therethrough, thereby fixedly attaching said flexible member to said rigid support.

In further accordance with the present invention, there is also provided a method of preparing a molded article comprising a molded flexible hollow thermoplastic member fixedly attached to a rigid support, said method comprising:

(a) placing said rigid support in a mold, said rigid support having a plurality of perforations having edges, a first surface and a second surface; and (b) blow molding a thermoplastic parison precursor of said flexible member against the first surface of said rigid support;

wherein a portion of the thermoplastic material of said thermoplastic parison extends through at least some of said perforations of said rigid support, the edges of said perforations being embedded in the plastic material extending therethrough, thereby attaching fixedly said flexible member to said rigid support.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions, such as those expressing structural dimensions, quantities of ingredients, etc. used in the specification and claims are understood as modified in all instances by the term "about."

BRIEF DESCRIPTION OF THE DRAWINGS

In FIGS. 1 through 7, like reference numerals designate the same components and structural features.

DETAILED DESCRIPTION OF THE INVENTION

Figure 1:
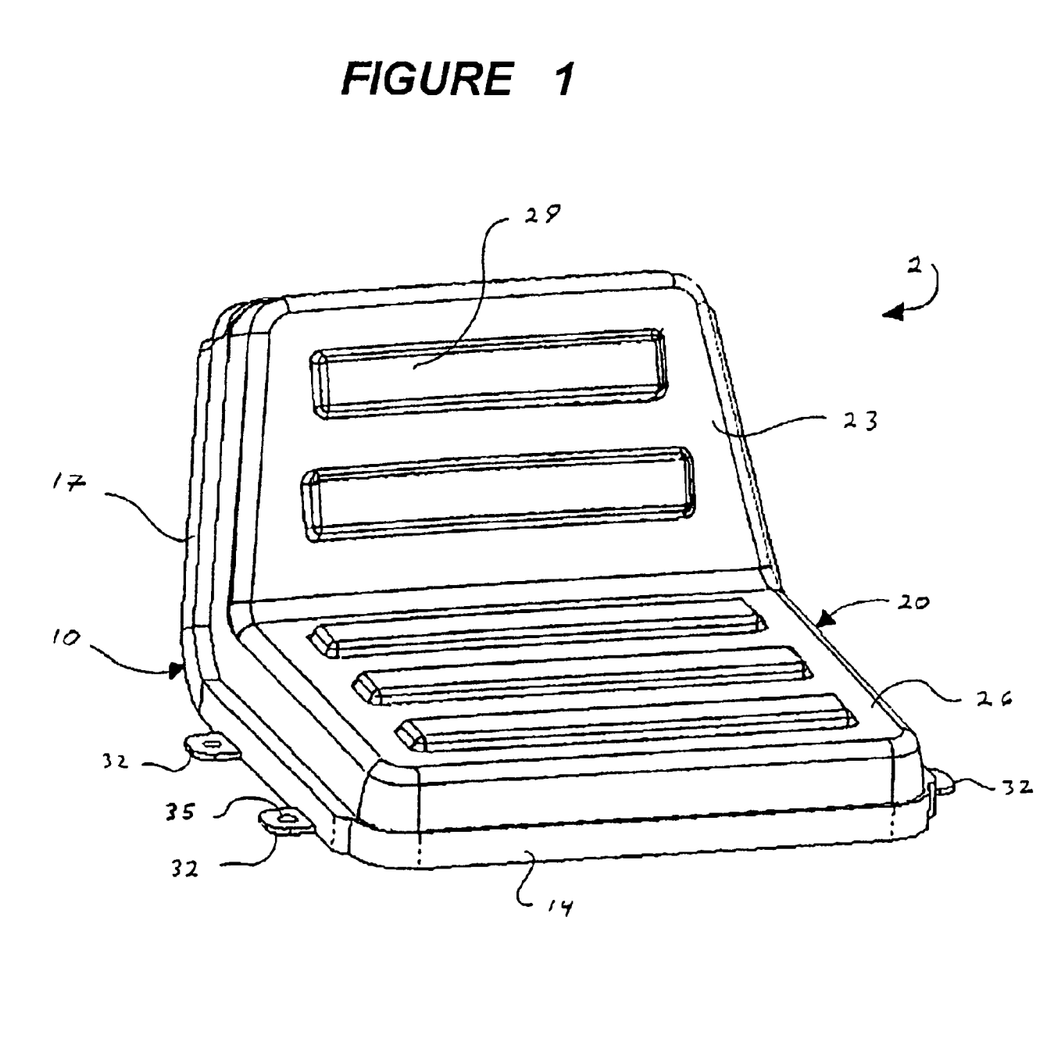
FIG. 1 is a representative perspective view of a molded seat according to the present invention which comprises a rigid support 10 and a molded flexible hollow thermoplastic member 20 fixedly attached thereto.

Referring now to FIG. 1 of the drawings, there is shown a molded seat 2 according to the present invention, which includes a rigid seat support 10 and a molded flexible cushion 20. Rigid seat support 10 is a unitary unit and includes a rigid seat back support 17 and a rigid seat bottom support 14. Flexible cushion 20 is a continuous member and includes a back cushion portion 23 and a bottom cushion portion 26. The outer surface of flexible cushion 20 has raised molded-in features 29. Rigid seat support bottom 14 includes flanges 32 having holes 35 therein, which provide means by which molded seat 2 can be fixedly attached to a separate support structure, e.g., the interior of a vehicle or the deck of a tractor or boat (not shown). Rigid seat support back 17 may also further include flanges (not shown) for fixedly attaching molded seat 2 to a separate support structure (not shown).

The rigid support (a), e.g., rigid seat support 10 of molded seat 2, of the molded article of the present invention may be selected from metal, thermoset plastic material, thermoplastic material and combinations thereof. Metals from which rigid support (a) may be selected include, but are not limited to, aluminum and steel. As used herein and in the claims the term "thermoset plastic material" means plastic materials having a three dimensional crosslinked network resulting from the formation of covalent bonds between chemically reactive groups, e.g., active hydrogen groups and free isocyanate groups. Thermoset plastic materials from which rigid support (a) may be fabricated include those known to the skilled artisan, e.g., crosslinked polyurethanes, crosslinked polyepoxides and crosslinked polyesters. Of the thermoset plastic materials, crosslinked polyurethanes are preferred. Rigid support 10 may be fabricated from crosslinked polyurethanes by the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components. Upon complete reaction of the injected components, the mold is opened and the molded article, e.g., rigid support (a), is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which rigid support (a), e.g., rigid seat support 10 of molded seat 2, may be fabricated include, but are not limited to, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyethylene, thermoplastic polypropylene, thermoplastic polybutylene terephthalate, thermoplastic polyvinylchloride, thermoplastic acrylonitrile-butadiene-styrene, thermoplastic polyurethane and mixtures or thermoplastic compositions containing one or more thereof. Of the thermoplastic materials from which rigid support (a) may be fabricated, thermoplastic polyamides are preferred.

Rigid support (a) may be fabricated from thermoplastic materials by the art-recognized process of injection molding, in which a molten stream of thermoplastic material, e.g., molten thermoplastic polyamide, is injected into a mold, e.g., an optionally heated mold. Upon cooling the filled mold, the molded article, e.g., rigid support (a), is removed. A preferred thermoplastic material from which rigid support (a) may be fabricated is thermoplastic polyamide, e.g., DURETHAN thermoplastic polyamide, commercially available from Bayer Corporation. Other art-recognized processes by which rigid support (a) may be fabricated from thermoplastic materials include, but are not limited to, blow molding and thermoforming.

The thermoset plastic materials and/or thermoplastic materials from which rigid support (a) may be fabricated, may optionally be reinforced with a material selected from glass fibers, carbon fibers, boron fibers, metal fibers, polyamide fibers (e.g., KEVLAR polyamide fibers) and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials of elongated rigid support 10 in a reinforcing amount, e.g., in an amount of from 5 percent by weight to 60 percent by weight, based on the total weight of rigid support (a).

As used herein and in the claims, the term "rigid" of rigid support (a) is used relative to the term "flexible" of the molded flexible thermoplastic member (b). That is, the rigid support (a) is more rigid than is the flexible hollow member (b), and correspondingly the flexible hollow member (b) is more flexible than the rigid support (a). More specifically, the rigid support (a), when fabricated from a thermoplastic or a thermoset material, typically has a flexural modulus of at least 1000 MPa, e.g., from 1000 to 15,000 MPa. The flexible hollow member (b) typically has a flexural modulus of less than 1000 MPa, e.g., less than 100 MPa or less than 70 MPa.

The thermoplastic material of the molded flexible hollow member (b), e.g., flexible thermoplastic cushion 20 of molded seat 2, is selected from at least one of thermoplastic vulcanizates, thermoplastic polyolefins, thermoplastic polyurethanes, thermoplastic polyureas, thermoplastic polyamides, thermoplastic polyesters and thermoplastic polycarbonates. Thermoplastic vulcanizates are vulcanized alloys of rubber and thermoplastic materials, having rubber and thermoplastic phases. The rubber phase of thermoplastic vulcanizates that may be used in the present invention include, but are not limited to, ethylene propylene diene rubber, natural rubber and butyl rubber. Examples of thermoplastics that may form the thermoplastic phase of the thermoplastic vulcanizates include, for example, polypropylene and polyethylene. Commercially available thermoplastic vulcanizates that may be used in the present invention include, for example, KRATON polymers, commercially available from GLS Corporation, and SANTOPRENE polymers, commercially available from Advanced Elastomers Systems.

Thermoplastic polyolefins from which the flexible hollow member (b) may be fabricated include, for example, polyethylene, polypropylene, copolymers of ethylene and propylene, and polybutylene. Preferred thermoplastic polyolefins include, but are not limited to, linear low-density polyethylene (LLDPE) and metallocene linear low-density polyethylene (mLLDPE). In a preferred embodiment of the present invention, flexible hollow thermoplastic member (b) is fabricated from thermoplastic polyurethane, e.g., TEXIN thermoplastic polyurethane or DESMOPAN thermoplastic polyurethane which are commercially available from Bayer Corporation.

The plastic materials of rigid support (a) and flexible thermoplastic hollow member (b) may each independently further contain one or more functional additives. Additives that may be present in the plastic material of the rigid support (a) and/or the flexible thermoplastic hollow member (b) of the molded article include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material of the rigid support and/or the flexible thermoplastic hollow member in functionally sufficient amounts, e.g., in amounts independently from 0.1 percent by weight to 10 percent by weight, based on the total weight of the plastic material of the rigid support or the flexible thermoplastic hollow member.

The flexible thermoplastic hollow member (b), e.g., flexible cushion 20, of the molded article of the present invention, may be formed by methods that are known to those of ordinary skill in the art. Such art recognized methods by which the flexible thermoplastic hollow member (b) may be prepared include, but are not limited to, blow molding, twin-sheet thermoforming, rotational molding, thermoplastic welding (e.g., vibration and/or radio frequency welding), two-piece over-molding and lost-core molding. In a preferred embodiment of the present invention, the flexible hollow thermoplastic member (b) is prepared by blow molding. The blow molding process is well known to the skilled artisan, and has been described previously herein.

Figure 2:
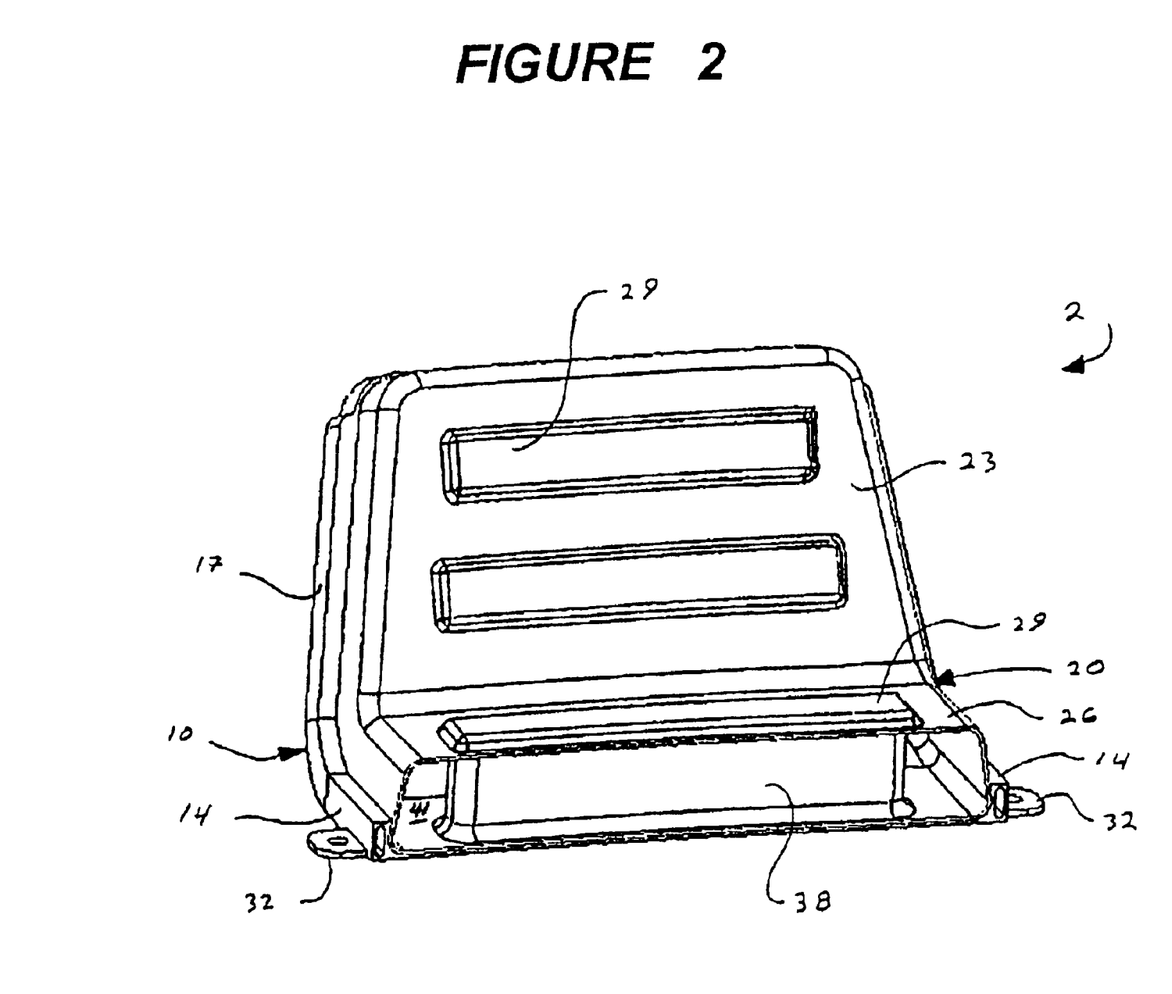
FIG. 2 is a representative partial cut-away perspective view of the molded seat of FIG. 1.

In FIG. 2 a sectional perspective view of molded seat 2 of FIG. 1 is depicted. The sectional perspective view reveals the hollow interior 41 of flexible thermoplastic cushion 20. Molded-in support columns (or ribs) 38, which are continuous with molded-in features 29, are also visible in FIG. 2. Molded-in support columns 38 are composed of the same flexible thermoplastic material as that of, and are continuous with flexible hollow cushion 20. Typically, molded-in support columns 38 are formed concurrently with the formation of flexible hollow member 20. For example, when formed by blow molding, the interior walls of the mold may have portions extending therefrom that serve to form molded-in support columns 38. Those portions of the mold interior that are opposite the mold extensions, may have depressions therein that serve to form molded-in features 29 during the blow molding process. Molded-in support columns 38 provide dimensional stability to flexible hollow cushion 20. Molded-in support columns 38 are also visible through openings 47 in rigid seat support 10. See FIG. 3.

The hollow interior 41 of flexible hollow cushion 20 may be filled with a material selected from pressurized gases, liquids, gels, polymeric foams and combinations thereof. Pressurized gasses that may be used to fill hollow interior 41 include, for example, air and nitrogen, preferably air. Liquids that may be used to fill hollow interior 41 include, for example, water, a mixture of water and propylene glycol, and a heat transfer oil. Liquids that may be used to fill hollow interior 41 also include viscoelastic liquids, such as viscoelastic liquid polymers, e.g., viscoelastic polyurethanes, that are known to the skilled artisan. The term "gel" as used herein and in the claims, with regard to filling the hollow interior of the flexible member of the molded article of the present invention, refers to art-recognized gels, which are typically in the form of viscous jellylike materials, that are used to provide cushioning, shock absorption and/or vibrational dampening properties. An example of a class of such gels that may be used in the present invention are glycerin gels. Examples of polymeric foams that may be used to fill hollow interior 41 are preferably flexible polymeric foams, and include those known to the skilled artisan, e.g., flexible polyurethane foams.

Filling materials, such as polymer foams, liquid and liquid gels may be introduced into the flexible hollow member (b) during or after the molding process, e.g., blow molding. Filling materials, such as polymeric foams, may be introduced into the hollow interior of flexible hollow member (b) during a blow molding process by means of one or more injection needles extending from the interior walls of the blow mold, as is know to the skilled artisan.

In an embodiment of the present invention, flexible hollow member (b), e.g., flexible hollow cushion 20, comprises means for reversibly increasing pressure within the hollow interior, e.g., hollow interior 41, such as a pressure regulating valve (not shown) that provides gaseous or fluid communication with the hollow interior of cushion 20. A pressure regulating valve may be incorporated into flexible hollow cushion 20 during or after the molding processes by which it is formed. In the case of blow molding, a pressure regulating valve may be placed into a recess within the inner wall of the mold (the valve extending partially from the recess). During the blow molding process, the valve becomes incorporated into flexible hollow cushion 20. A pressure regulating valve may be incorporated into the flexible hollow member (b) after the molding process by means of art recognized methods, which typically include plastic welding techniques, such as thermal welding, radio frequency welding and solvent welding.

During use of molded seat 2, the integral pressure regulating valve (not shown) may be connected to a source of pressurized gas (e.g., a pump or a reservoir connected to a pump, not shown). An individual sitting on molded seat 2, may then reversibly increase or decrease the pressure within flexible hollow cushion 20 by means of the pressure regulating valve to suit their own comfort.

Alternatively, the pressure regulating valve (not shown) may be connected to a source of liquid, such as a reservoir of heat exchange fluid, e.g., a mixture of water and propylene glycol. The liquid can be either heated or cooled (e.g., by means of a heat exchanger, not shown) and pumped into or cycled through flexible hollow cushion 20 by means of one or more pressure regulating valves, e.g., one or more integral pressure regulating valves (not shown). The liquid, in addition to being either heated or cooled may, for example, also be: (i) controllably pumped into cushion 20 to increase the pressure therein; (ii) cycled through cushion 20 to maintain a selected level of pressure therein; or (iii) controllably released from cushion 20 to decrease the pressure therein. Heated liquid that may be introduced into the interior of cushion 20 is typically heated to a temperature greater than or equal to 25° C., e.g., 30° C., 50° C. or 70° C. Cooled liquid that may be introduced into the interior of cushion 20 is typically cooled to a temperature of less than 25° C., e.g., 20° C., 15° C. or 10° C. An individual sitting on molded seat 2, may then, in addition to reversibly increasing or decreasing the pressure within flexible hollow cushion 20, also concurrently and reversibly adjust the temperature of cushion 20 to suit their own comfort.

Flexible hollow cushion 20 may further comprise a fabric covering on at least a portion of its outer surface in an embodiment of the present invention. The fabric covering may be pulled over cushion 20 after its formation. Alternatively, the fabric covering may be formed on the outer surface of cushion 20 during its formation. When prepared by blow molding, a fabric insert may be placed over at least a portion of the interior surfaces of the mold. During the blow molding process, the parison contacts and becomes fused with the fabric insert. When removed from the mold, cushion 20 has an integral fabric covering on at least a portion of its outer surface.

In an embodiment of the present invention, flexible hollow member (b), e.g., flexible hollow cushion 20, has an integral film on at least a portion of its outer surface. The integral film is formed on the outer surface of the flexible hollow member by means of an in-mold decoration process. The integral film is typically a plastic film, e.g., a thermoplastic or thermoset plastic film, and may be clear, tinted or opaque, e.g., pigmented. Additionally, the integral film may have indicia, patterns and/or printing thereon. Preferably the integral film is a thermoplastic film, e.g., a thermoplastic polyurethane or polycarbonate film. The integral film is typically incorporated into the outer surface of cushion 20 during the molding process, i.e., by means of an in-mold decoration process. When prepared by blow molding, a film insert, e.g., a thermoplastic polyurethane film insert, is typically placed in contact with at least a portion of the interior surface of the mold. During the blow molding process, the parison contacts and becomes fused to the film insert. Upon removal from the mold, flexible hollow cushion 20 has an integral film in and/or on at least a portion of its outer surface.

The film insert may have indicia, patterns and/or printing on at least a portion of one surface, e.g., on at least a portion of its first and/or second surfaces. The first surface of the film insert is that surface which contacts the inner surface of the mold. The second surface of the film insert is opposite the first surface, faces the interior of the mold, and comes into direct contact with the parison during the blow molding process.

The exterior surface of flexible hollow cushion 20 may have molded-in texture. Molded-in texture can serve to give cushion 20 a leather-like appearance. The molded-in texture is typically formed by a plurality of raised portions and/or recesses on and/or in the interior surface of the mold in which cushion 20 is formed.

Figure 3:
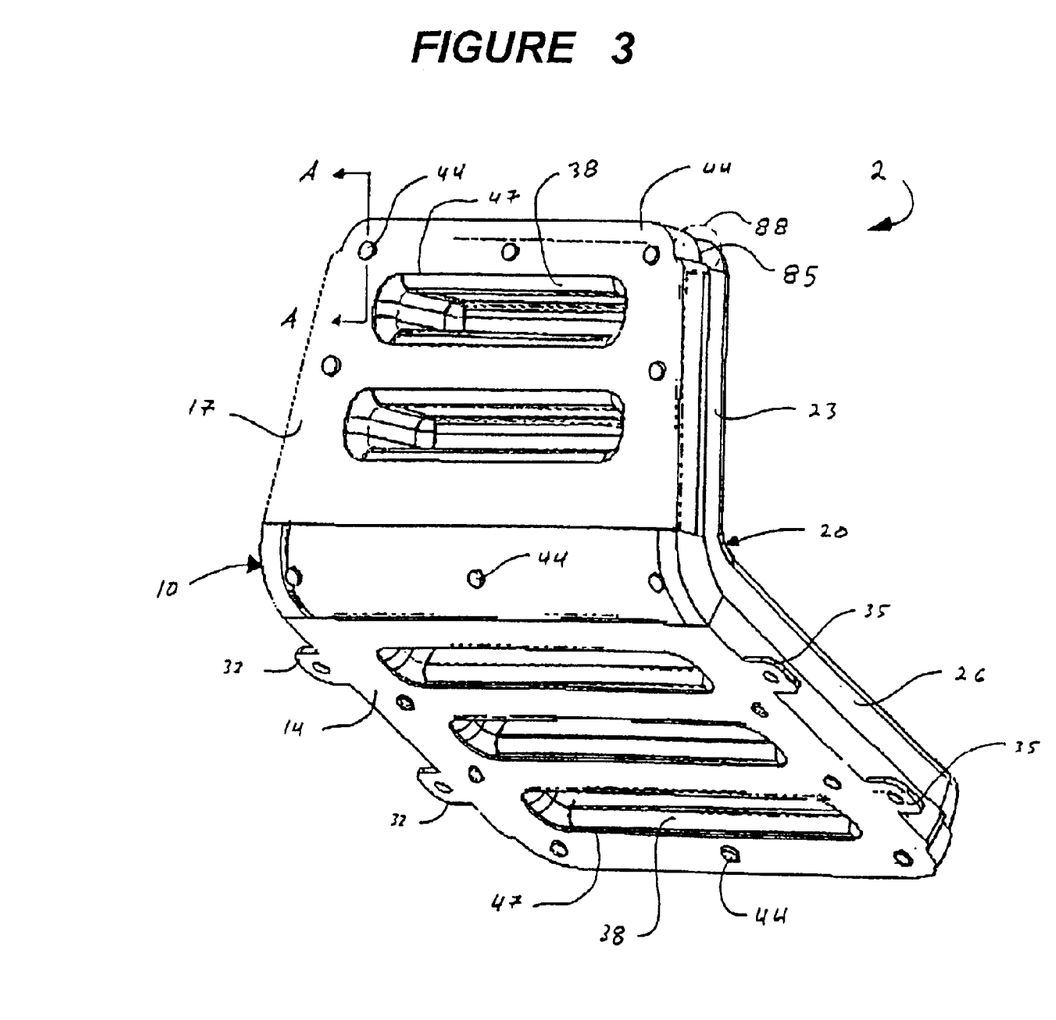
FIG. 3 is a representative perspective view of the back of the molded seat of FIG. 1.
Figure 4:
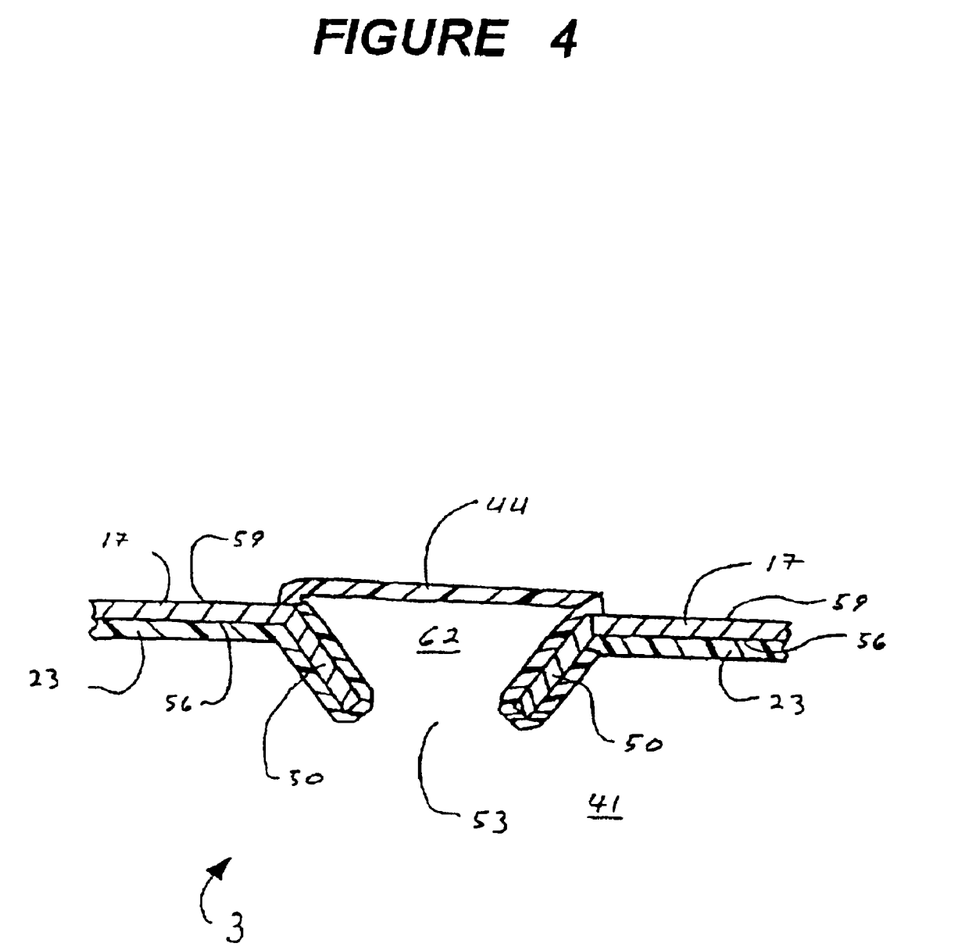
FIG. 4 is a representation of a section of an attachment means through line A—A of FIG. 3.

With reference to FIGS. 3 and 4, flexible cushion 20 is fixedly attached to rigid seat support 10 by means of attachment heads 44. Rigid seat support 10 has a plurality of perforations having edges (not shown). Portions of flexible cushion 20 extend through at least some of these perforations and form attachment heads 44, the edges of the perforations become embedded in the flexible material extending therethrough, and flexible cushion 20 is thus fixedly attached to rigid seat support 10.

A sectional representation through line A—A of an attachment head 44 on rigid seat back support 17 of FIG. 3, is depicted as attachment means 3 in FIG. 4. Rigid seat back support 17 has a perforation 53 therein. Perforation 53 is defined by deformed edge portions 50. Alternatively, perforation 53 may be defined by non-deformed edge portions (not shown). A portion of flexible back cushion 23, which abuts surface 56 of support 17, extends through perforation 53 embedding edges 50 therein. The portion of flexible back cushion 23 extending through perforation 53, further extends out over surface 59 of support 17 and forms attachment head 44. Attachment head 44 of FIG. 4 may be shaped by means of corresponding depressions in the interior wall of the mold (not shown).

In FIG. 4, the hollow interior 41 of flexible back cushion 23 is in communication with the hollow interior 62 of attachment head 44. By selecting perforation 53 of smaller diameter and/or flexible thermoplastic material (e.g., of back cushion 23) of greater thickness, the flexible material extending through perforation 53 may fuse together, effectively plugging perforation 53 and forming a substantially solid attachment head 44 (not shown).

Figure 6:
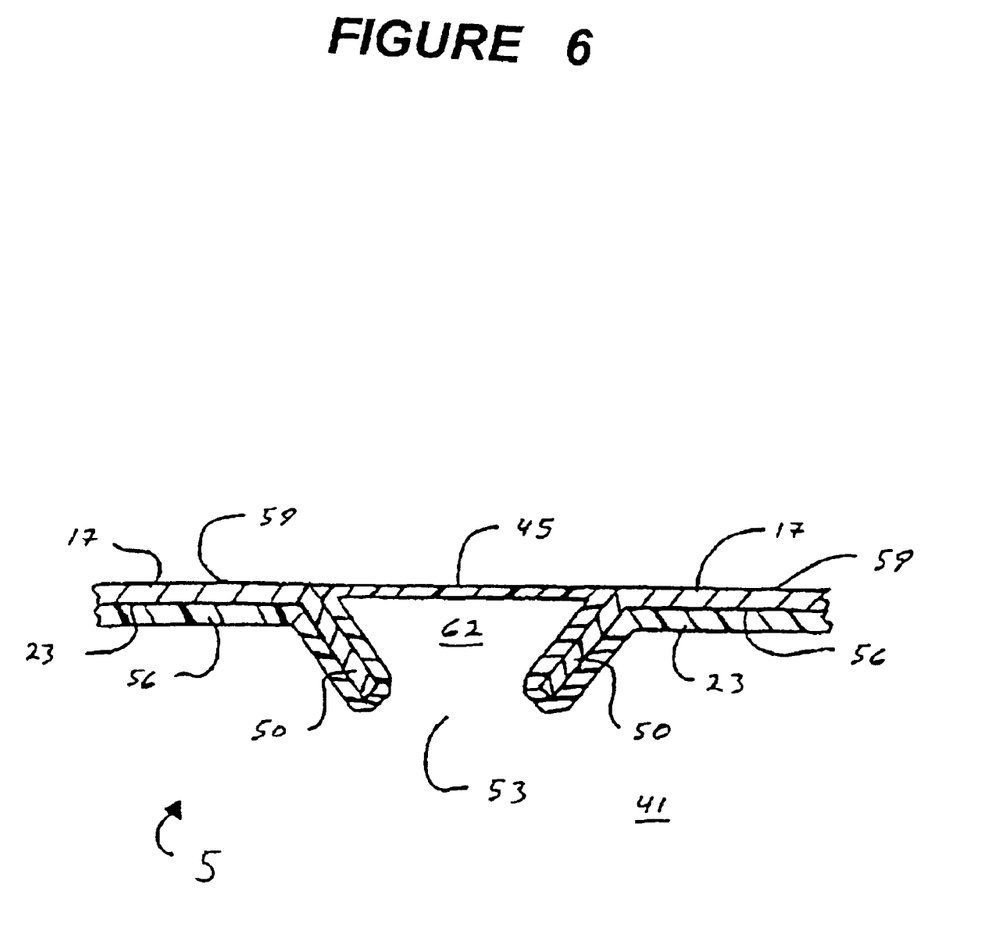
FIG. 6 is a sectional representation of an attachment means similar to that of FIG. 4.

Attachment means 5 of FIG. 6 is similar to attachment means 3 of FIG. 4. Attachment head 45 of attachment means 5, however, is substantially flush with second surface 59 of support 17. The flush attachment head 45 is formed by means of the interior surface of the mold being substantially flush or in abutment with second surface 59 of support 17.

In addition to attachment means 3 and 5 of FIGS. 4 and 6, flexible thermoplastic cushion 20 of molded seat 2 may be further fixedly attached to rigid seat support 10 by attachment means selected from fasteners, adhesives and combinations thereof. Examples of fasteners that may be used in the present invention include, but are not limited to, screws, e.g., sheet metal screws, nuts and bolts, and metal rivets. Adhesives that may be used include those that are known to the skilled artisan, e.g., epoxy resin based adhesives.

As used herein and in the claims, the term "adhesives" refers to: (i) adhesive materials that are separate from the rigid support and the flexible thermoplastic member, e.g., epoxy resin based adhesives; and (ii) cohesive adhesion between the rigid support and the flexible thermoplastic member. The materials from which each of the rigid support and the flexible thermoplastic member may be selected such that cohesive adhesion therebetween results from their mutual abutment. In an embodiment of the present invention, the rigid support (a) is fabricated from steel, poly(acrylonitrile-butadiene-styrene) or polycarbonate, and the flexible hollow thermoplastic member (b) is fabricated from thermoplastic polyurethane, and cohesive adhesion results from their mutual abutment.

In an embodiment of the present invention, rigid seat support 10 and molded flexible hollow cushion 20 are each fabricated separately, and then cushion 20 is fixedly attached to rigid support 10. Cushion 20 is positioned in abutting relation with a first surface of rigid seat support 10, such that at least some of the perforations 53 in support 10 are covered by cushion 20. Typically, at least those portions of cushion 20 that cover perforations 53 are heated to soften the thermoplastic material of cushion 20. Reduced pressure is formed on the side of support 10 that is opposite its first surface (i.e., the second surface of support 10), and/or increased pressure is formed on the interior of cushion 20. Those softened portions of cushion 10 are thus drawn through perforations 53, embedding edges 50 in the thermoplastic material extending therethrough, and forming attachment heads 44 on the second surface of support 10.

In a preferred embodiment of the present invention, flexible hollow cushion 20 is fixedly attached to rigid seat support 10 during the blow molding formation of cushion 20. Rigid seat support 10, having a plurality of perforations 53, is placed on one side of the blow mold, its second surface facing the interior surface of the mold wall, and its first surface facing the open interior of the mold. A parison precursor of flexible hollow cushion 20 is blow molded onto the first surface of rigid support 10, a portion of the thermoplastic material of the parison extends through at least some of perforations 53 of support 10 to form attachment heads 44. Edges 50 of perforations 53 become embedded in the thermoplastic material of the parison extending therethrough, thereby fixedly attaching flexible cushion 20 to rigid seat support 10.

To assist the extension of portions of the parison through perforations 53, at least one of: (i) increased gaseous pressure is provided on the interior of the thermoplastic parison; and (ii) reduced gaseous pressure is provided on the second surface of rigid support 10, thereby forcing (e.g., drawing and/or pushing) portions of the thermoplastic parison through at least some of perforations 53. In an embodiment of the present invention, the parison is extended through perforations 53 by the concurrent implementation of methods (i) and (ii).

The rigid support (a) may have extensions, e.g., anchoring extensions, which extend into the flexible thermoplastic hollow member (b). Each extension has walls, e.g., side walls, a hollow interior (e.g., a chamber), and at least one perforation in its walls. Portions of the flexible hollow member (b) extend through the perforations of the anchoring extensions and into the chamber thereof. In an embodiment of the present invention, all of the perforations of the rigid support (a) are located within the walls of the anchoring extensions, and the flexible hollow member (b) is fixedly attached to rigid support (a) by means of the anchoring extensions. The anchoring extensions may have any desired shape, but are typically substantially cylindrical.

Figure 5:
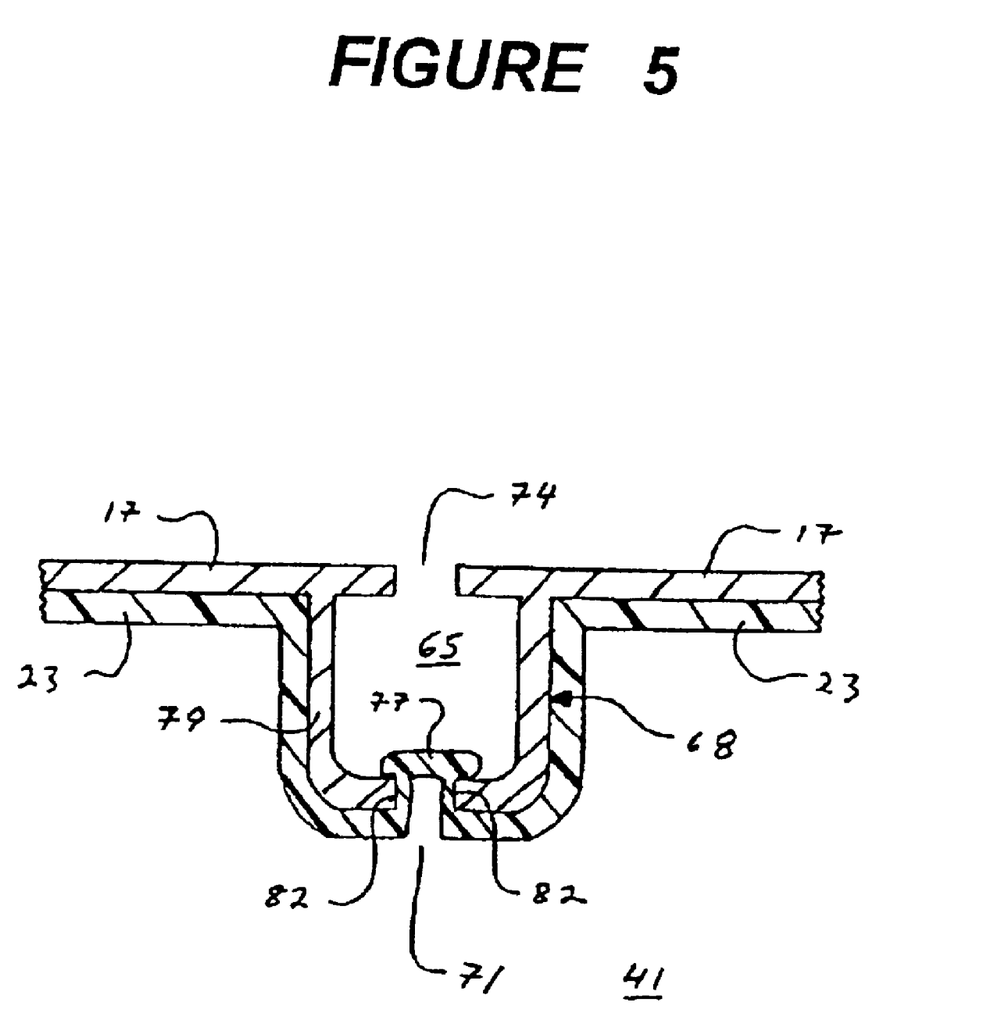
FIG. 5 is a sectional representation of an anchoring extension extending into the molded flexible hollow thermoplastic member of a molded seat according to the present invention.

In FIG. 5, a sectional view of an anchoring extension 68 extending into flexible back cushion portion 23 is depicted. Extension 68 has walls 79 and a perforation 71. Perforation 71 has edges 82 which are embedded in the flexible thermoplastic material of cushion 23 which extends therethrough. The flexible thermoplastic material of cushion 23 extending through perforation 71 forms attachment head 77 within chamber 65 of extension 68. Rigid back support 17 has a perforation 74 therein which is in communication with chamber 65 of extension 68. Perforation 74 can be used to form a vacuum within chamber 65, to assist in drawing attachment head 77 therein during molding operations, e.g., blow molding. To prevent attachment head 77 from bursting during the blow molding process, a reversibly retractable core pin (not shown) may be extended from the interior wall of the mold through perforation 74 into chamber 65 to provide a limiting surface against which attachment head 77 abuts during its formation, as is known to the skilled artisan. While anchoring extension 68 is depicted as having only one perforation 71 in FIG. 5, it may have a plurality of perforations through which the flexible material of cushion 23 extends to form additional attachment heads within chamber 65.

An advantage of using anchoring extensions to fixedly attach cushion 20 to rigid support 10 is the recession and accompanying protection that is afforded attachment head 77 within chamber 65. After formation of molded seat 2, a thermosetting polymer composition, e.g., a two-pack epoxy or polyurethane composition, can be introduced into chamber 65 by means of perforation 74. The introduced thermosetting polymer composition at least partially fills chamber 65 and serves to protect and hold attachment head 77 in place.

Figure 7:
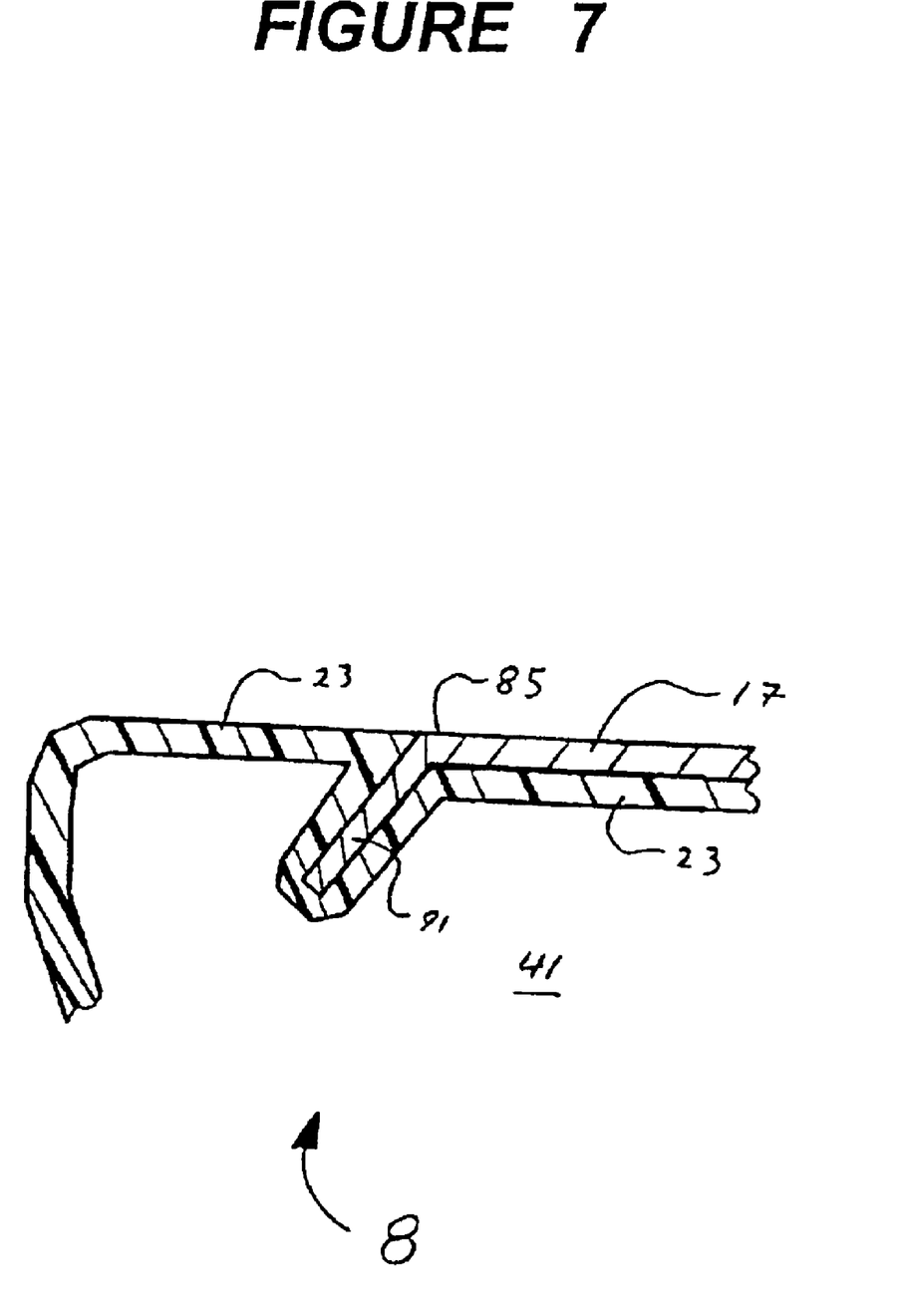
FIG. 7 is a sectional representation of a wrap-around attachment means, in which a portion of flexible hollow member (b) wraps around and embeds at least a portion of the edges of rigid support (a) therein.

In an embodiment of the present invention, rigid support (a) has edges which are at least partially embedded in portions of flexible hollow member (b) that are wrapped there around (wrap-around attachment means). A sectional representation of a wrap-around attachment means 8 is depicted in FIG. 7. With further reference to FIG. 7, edge portion 85 of rigid support 17 (also shown within highlighted area 88 of FIG. 3) has an extension 91 which is embedded in the flexible thermoplastic material of back cushion 23. Such wrap-around attachment means are preferably formed during the blow molding formation of flexible cushion 20 (including back cushion portion 23). Wrap-around attachment means, such as attachment means 8 of FIG. 7, serve to further fixedly attach flexible hollow member (b) to rigid support (a) of the molded article of the present invention. In another embodiment of the present invention (not shown), extension 91 of wrap-around attachment means 8 is not present, and edge portion 85 is beveled or chamfered (not shown). The beveled edge portion of the rigid support (a) is at least partially embedded in portions of the thermoplastic material of flexible hollow member (b) that are wrapped there around.

The rigid support (a) of the molded article of the present invention may be solid or hollow. In an embodiment of the present invention, the rigid support (a) is a rigid hollow support (e.g., a rigid substantially tubular support) having an exterior (first) surface, an internal (second) surface defining the hollow interior of the hollow support, and a plurality of perforations. At least a portion of the flexible hollow thermoplastic member (b) extends through at least some of the perforations into the hollow interior of the rigid hollow support (a).

Molded articles according to the present invention include, but are not limited to: seats, such as chairs (e.g., indoor chairs and outdoor chairs, such as patio furniture), bleachers, bicycle seats, tractor seats and motor cycle seats; cushioned panels, such as cushioned wall panels and cushioned door panels; and automotive air-bags. Cushioned wall panels according to the present invention include, for example, cushioned wall panels that may be use in gymnasiums, e.g., on the gymnasium walls behind a basket ball hoop.

The present invention has been described with reference to specific details of particular embodiments thereof. It is not intended that such details be regarded as limitations upon the scope of the invention except insofar as and to the extent that they are included in the accompanying claims.

What is claimed is:

1. A molded article comprising:
   a rigid support having a surface and a plurality of perforations having edges; and
   a molded flexible member of thermoplastic material, at least a portion of said flexible member being in abutting relationship with at least a portion of the surface of said support, said flexible member having a hollow interior, said flexible member comprising means for reversibly increasing pressure within the hollow interior of said flexible member,
   wherein a portion of said flexible member extends through at least some of the perforations of said rigid support, the edges of said perforations being embedded in the portions of the flexible member extending therethrough, thereby fixedly attaching said flexible member to said rigid support.

2. The article of claim 1 wherein said rigid support is fabricated from a material selected from metal, thermoset plastic material, thermoplastic material and combinations thereof.

3. The article of claim 2 wherein said rigid support is fabricated from thermoplastic material optionally reinforced with a material selected from glass fibers, carbon fibers, metal fibers, polyamide fibers and mixtures thereof.

4. The article of claim 1 wherein the thermoplastic material of said flexible member is selected from at least one of thermoplastic vulcanizates, thermoplastic polyolefins, thermoplastic polyurethanes, thermoplastic polyureas, thermoplastic polyamides, thermoplastic polyesters and thermoplastic polycarbonates.

5. The article of claim 1 wherein said flexible member has an outer surface, said flexible member further comprising a fabric covering on at least a portion of said outer surface of said flexible member.

6. The article of claim 1 wherein said flexible member has an outer surface, at least a portion of said outer surface having molded-in texture.

7. The article of claim 1 wherein said flexible member has an outer surface, said flexible member further comprising an integral film on at least a portion of said outer surface, said integral film being formed on said outer surface by means of an in-mold decoration process.

8. The article of claim 1 wherein said flexible member is further fixedly attached to said rigid support by attachment means selected from fasteners, adhesives and combinations thereof.

9. The article of claim 1 wherein the interior of said flexible member is filled with a material selected from, pressurized gas, liquid, gel, polymeric foam and combinations thereof.

10. The article of claim 1 wherein said means for reversibly increasing pressure within the hollow interior of said flexible member comprises at least one pressure regulating valve that provides fluid communication with the hollow interior of said flexible member, and one of a heated liquid and a cooled liquid are reversibly introduced into the hollow interior of said flexible member through said at least one pressure regulating valve.

11. The article of claim 1 wherein said article is a seat.

12. The article of claim 11 wherein said rigid support comprises a rigid seat back support and a rigid seat bottom support, and said flexible member comprises flexible cushions fixedly attached to each of said rigid seat back support and rigid seat bottom support.

13. The article of claim 11 wherein said rigid support is a continuous unitary unit.

14. The article of claim 1 wherein at least some of said perforations have deformed edge portions, and said deformed edge portions are embedded in the flexible member material extending therethrough.

15. The article of claim 1 wherein said rigid support is a rigid hollow support having an exterior surface and a hollow interior, said flexible member being in abutting relationship with at least a portion of the exterior surface of said hollow support, at least a portion of said flexible member extends through at least some of said perforations into the hollow interior of said rigid hollow support.

16. The molded article of claim 1 wherein said rigid support has a plurality of anchoring extensions extending into said flexible member, each of said anchoring extensions having walls, an interior chamber and at least one wall perforation in said walls, each wall perforation having edges, a portion of said flexible member extends through at least some of said wall perforations into said chamber, the edges of said wall perforations being embedded in the plastic material extending therethrough, thereby fixedly attaching said flexible member to said rigid support.

17. The molded article of claim 1 wherein said rigid support has edges, and said flexible member is further fixedly attached to said rigid support by means of portions of said flexible member wrapping around and embedding at least a portion of the edges of said rigid support.

18. The molded article of claim 1 wherein said molded flexible hallow member has a flexural modulus of less than 1000 MPa.

19. The molded article of claim 1 wherein said molded flexible hollow member has a flexural modulus of less than 100 MPa.

20. The molded article of claim 1 wherein said molded flexible hollow member has a flexural modulus of less than 70 MPa.

* * * * *